United States Patent [19]
Brock

[11] 3,877,625
[45] Apr. 15, 1975

[54] SEVERING PROCEDURE AND APPARATUS FOR PLASTIC MATERIAL

[76] Inventor: Reginald L. Brock, Rt. No. 44, Salisbury, Conn. 06068

[22] Filed: June 4, 1973

[21] Appl. No.: 366,734

[52] U.S. Cl. .................... 225/2; 83/171; 225/96.5; 225/103
[51] Int. Cl. .............................................. B26f 3/00
[58] Field of Search ............... 225/1, 2, 4, 94, 96.5, 225/96, 103; 83/51, 171; 264/157, 159, 160

[56] References Cited
UNITED STATES PATENTS

| | | | |
|---|---|---|---|
| 2,789,640 | 4/1957 | Belden | 225/4 X |
| 2,997,905 | 8/1961 | Larson | 83/171 |
| 3,494,523 | 2/1970 | Kalvelage | 225/96.5 X |
| 3,754,489 | 8/1973 | Carver et al. | 83/171 X |
| 3,757,627 | 9/1973 | Lange | 83/51 X |

Primary Examiner—Andrew R. Juhasz
Assistant Examiner—Leon Gilden
Attorney, Agent, or Firm—Parmelee, Miller, Welsh & Kratz

[57] ABSTRACT

A positive acting apparatus or machine is disclosed having an upper, downwardly movable blade assembly and a lower fixed position opposed blade assembly for cutting-off selected lengths of a resin or plastic sheet-like material. Fluid motors are employed for raising and lowering the upper blade assembly, and rack and gear means is provided for assuring that both end portions of the assembly move in exact synchronism. The upper blade is aligned with and operated on the same vertical plane as the lower blade, and means is provided for stopping downward movement of the upper blade when it approaches close adjacency with but before it engages the lower blade. Electrical heating elements extend longitudinally along the blade assemblies and are energized to maintain the blades at a raised temperature during their application to the material. A withdrawal of the upper blade assembly after its downward stroke causes the under-engagement of an ejector with the main body of the material to move it upwardly with respect to and off the lower blade. Later, the advance portion of the material is severed from the main body by breaking the sheet at the line of previous blade action.

11 Claims, 9 Drawing Figures

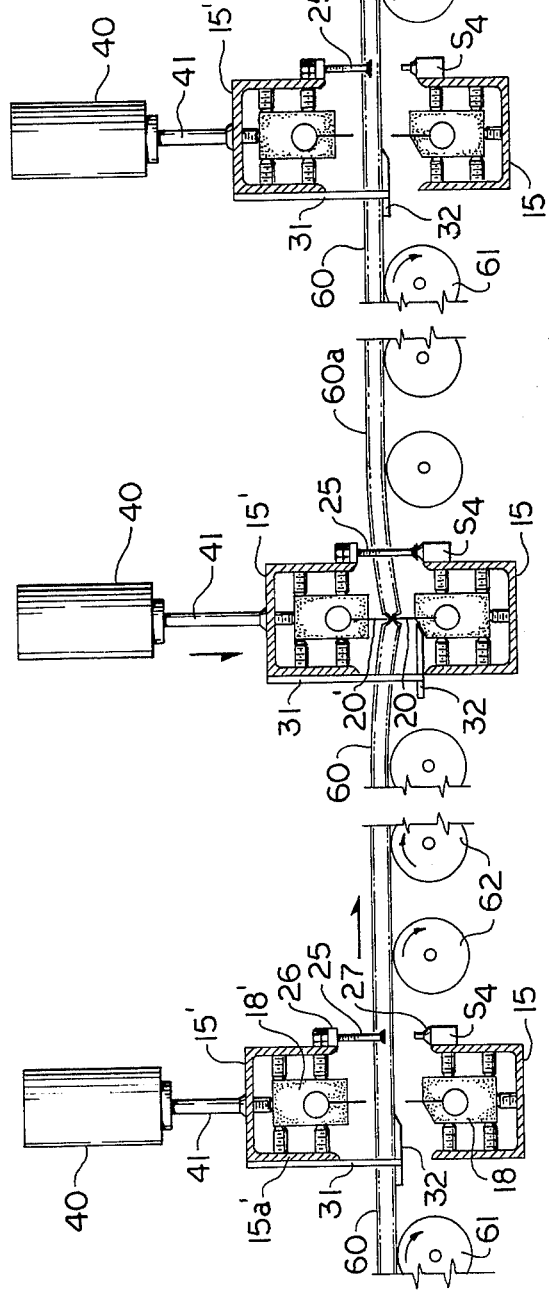
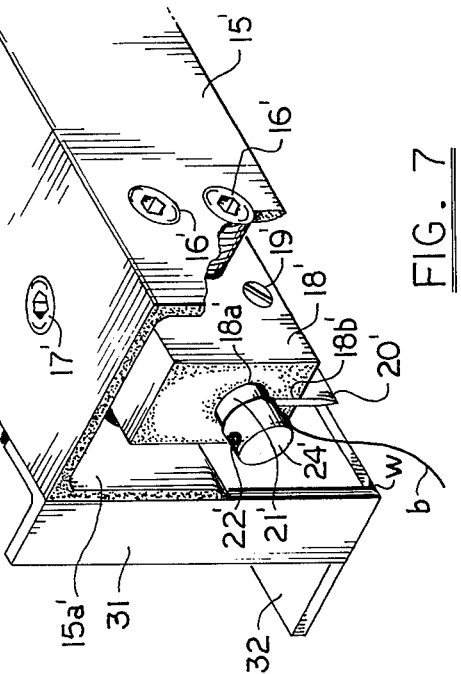
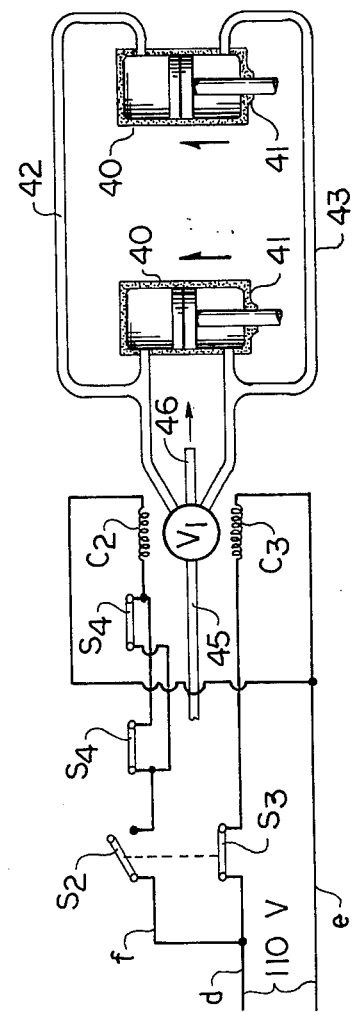

3,877,625

1

SEVERING PROCEDURE AND APPARATUS FOR PLASTIC MATERIAL

BACKGROUND OF THE INVENTION

1. Field of the Invention

This invention relates to a new and improved apparatus for severing or cutting-off lengths of plastic or resin material from a continuous strip or sheet and, particularly, to a machine or process whereby a cutting-off operation may be effectively accomplished without damaging the material.

2. Description of the Prior Art

There have been two conventional methods of cutting plastic or resin sheet material into suitable lengths as it is extruded. A hydraulic shear has been used for relatively tough and heavy sheet material, such as a polycarbonate. This method, however, is not satisfactory for a sheet of resin in the nature of an acrylic or polystyrene since it tends to cause a shattering of its edges. The usual method of cutting the latter type of resin is to employ a traveling cut-off saw, but this has several disadvantages. In the first place, it generates a considerable amount of sawdust which contaminates air in the room and adheres to the sheet, causing a cleaning problem. In the second place, the sawing operation takes a measurable period of time to cut across the width of the material, and makes it difficult to maintain an absolutely square cut. Finally, the saw is extremely noisy and represents a problem of ear damage to employees working in the area for long periods of time.

There has been a need for an improved cutting-off method, machine or apparatus which will have the ability to substantially simultaneously cut-off the full width of a piece of material, that will be effective for various types of resin or thermoplastic materials, that will assure a full length accurate cut, and that will eliminate health hazards and loss of time that exist in connection with the use of a traveling saw.

SUMMARY OF THE INVENTION

In view of the above considerations, it has been an object of the invention to devise new and improved procedure for effectively and efficiently cutting-off pieces from a continuous length or body of resin sheet or strip material.

Another object of the invention has been to develop new and improved apparatus for cutting across the full width of resin or plastic material.

Another object has been to eliminate disadvantages and limiting features of prior procedure and apparatus for severing plastic or resin material.

A further object of the invention has been to develop apparatus for cutting across the full width of various types of resin or plastic materials without damaging them or giving rise to an uneven type of cut.

These and other objects of the invention will appear to those skilled in the art from the illustrated embodiments and the claims.

BRIEF DESCRIPTION OF THE DRAWINGS

FIGS. 5A, 5B and 5C represent, somewhat diagrammatically, steps in a process of the cutting-off pieces or lengths of sheetlike resin material, employing a process and apparatus of the invention.

FIG. 5A is representative of the positioning of upper and lower blade assemblies shown in the left hand portion of FIG. 1, wherein a body of the material is being advanced endwise through a transverse mouth of the apparatus by suitable means such as rolls.

FIG. 5B shows the positioning of cutter blade or knife assemblies represented by the right hand portion of FIG. 1, wherein the two blades have advanced to a close, non-abutting adjacency to simultaneously hot-cut across the full width of a length of material; in this view, the upper blade assembly is in its "down" or cutting position and an ejector blade or guide member carried thereby has moved downwardly out of a supporting relation with respect to the material. The advancing movement of the material has been stopped during this cutting-off operation.

In FIG. 5C the upper cutting blade assembly has been raised until the ejector blade is in an under-supporting position with respect to the advancing end portion of the main body of the resin material to thus lift the material off the bottom blade and complete the blade-to-material separation along sticky score lines, groove-like indentations or recess lines. Also, the sheet material is advanced to a separating station at which the forward piece is broken-off or completely separated from the main body at the cut line area.

FIG. 6 is a schematic diagram showing electrical means for controlling the operation of pneumatic cylinders or fluid motors that are employed to lower and raise the upper cutting blade assembly. The motors in the position shown have started to raise the assembly from a cutting-off position.

Figure 2:
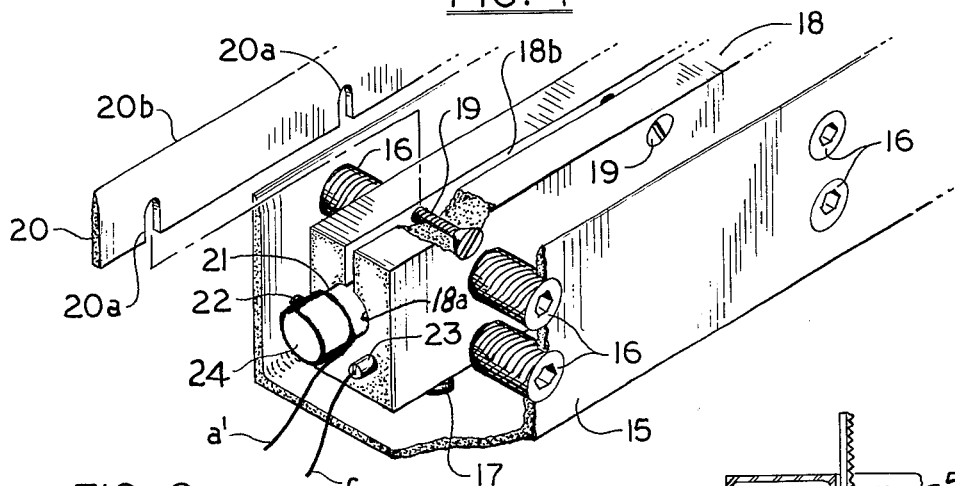
FIG. 2 is a greatly enlarged, exploded perspective detail in elevation and partial section showing the construction of a lower or fixed cutting blade assembly.

And, FIG. 7 is a fragmental end perspective on the enlarged scale of FIG. 2, particularly illustrating the construction of the upper or reciprocating cutting blade assembly.

DESCRIPTION OF THE PREFERRED EMBODIMENT

Figure 1:
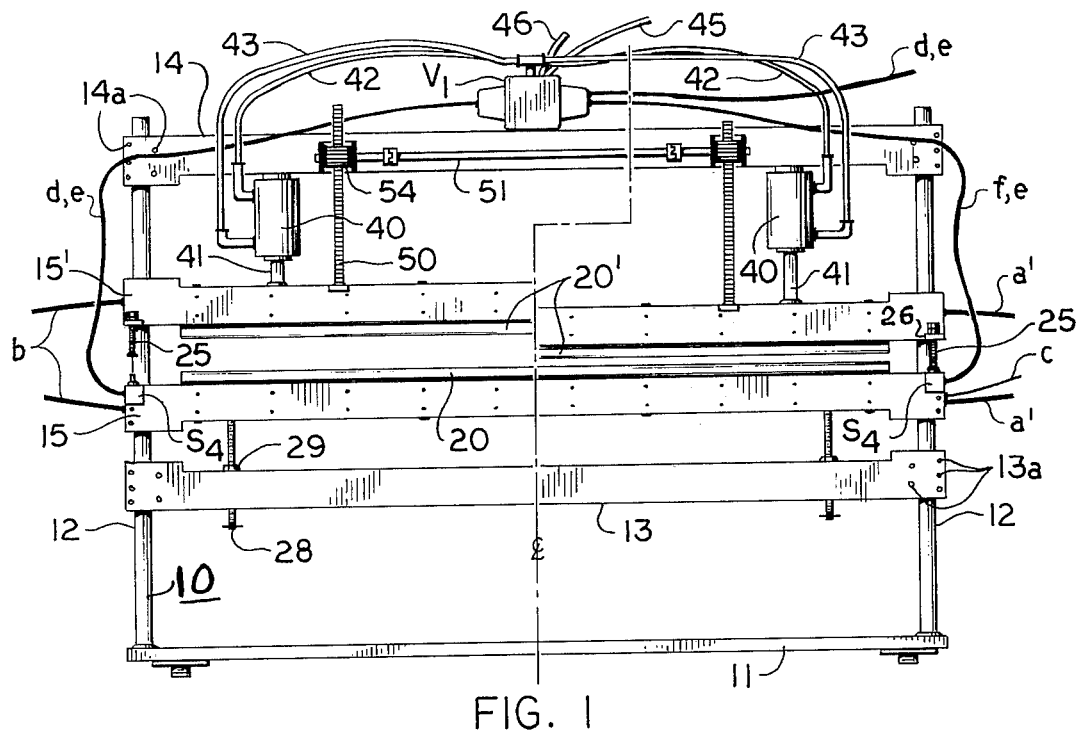
FIG. 1 is an end view in elevation of a representative cutting-off machine constructed in accordance with the invention; the left hand portion of the figure shows a movable cutting blade assembly in an upper or inoperative position, while the right hand portion shows the blade assembly in a final "down" or cutting position (the distance between the blades is exaggerated in this showing).

Referring to FIG. 1, a cutting-off machine or apparatus 10 is shown as having a rectangular frame structure defined by a cross-extending, fixed-position, channel-shaped, lower connecting member 11, a pair of cylindrical, transversely spaced-apart, upright column members 12, an intermediate, fixed-position, channel-shaped, connecting member 13, and a cross-extending, fixedly-mounted, channel-shaped, upper connecting member 14. A normally fixed positioned, cross-extending, channel-shaped member 15 (see also FIG. 2) is adapted to be adjusted as to its position along the columns 12 by means of a pair of threaded bolts or pins 28 that extend upwardly from the intermediate cross member 13. The adjusted position of each pin 28 is retained by a nut 29.

To simplify the showing and description, similar parts for the lower cutting blade assemblies have been provided with the same reference numerals, but parts of the upper assembly have been designated by prime suffixes. A cross-extending, blade-supporting head member 18 is centrally adjustably mounted within the channel-like member 15 by means of transversely spaced-apart, horizontally, through-extending, side-mounted, Allen head screws 16 and transversely spaced-apart vertically positioned Allen head screws 17. As particularly shown in FIG. 2, the screws 16 and 17 enable the head member 18 to be accurately aligned with a corresponding head member 18' of the upper cutter blade assembly (see FIG. 7).

A temperature-sensitive metal insert element 23 is shown positioned to extend within one end of the head 18, and a suitable electrical heating element, such as a Calrod element 21, is shown positioned to extend fully from end to end of the head member 18, within a centrally disposed, fully extending bore 18a therein. Each end of the heating element 21 has an electric connector metal cap 24 of a suitable material, such as of brass, secured thereon as by a set screw 22. One cap 24 is connected to one electrical lead $a'$, while the other cap 24 is connected to an opposite electrical lead $b$ (see FIG. 4). The upper side of the head 18 has a longitudinally extending, open-end slot 18b therein which is adapted to receive a suitable metal cutting blade 20 therein. As shown in FIG. 2, the blade 20 has an upper cutting edge portion 20b and a series of spaced-apart mounting slots 20a that are open to its bottom edge and that are adapted to fit over and receive a group of transversely spaced-apart, flush-head, through-extending mounting screws 19. Each screw 19 (as shown in FIG. 2) has a threaded mounting between the lips of the upper side of the head 18 to flex them together and provide a tight gripping action on the blade 20 when it is positioned in the slot 18b.

The upper blade assembly, as particularly shown in FIG. 7, is generally of the same construction as the lower blade assembly, except that channel support member 15' of the upper blade, in addition, carries an ejector blade or plate member 32 which extends along the full length extent of the upper assembly, behind the blade 20'. The ejector blade 32 is suspended from a back flange wall 15a' of the channel member 15' by a pair of legs 31 which extend downwardly adjacent each end of the member 15'. The pair of end-positioned legs 31 are secured by weld metal $w$ between the back wall 15a' and opposite ends of the ejector blade 32. If as shown, the members 31 are of angle shaped, then one leg flange which lies along the wall 15a' is slightly shorter than the other flange leg so as to rest upon the upper face of the ejector blade 32.

Figure 3:
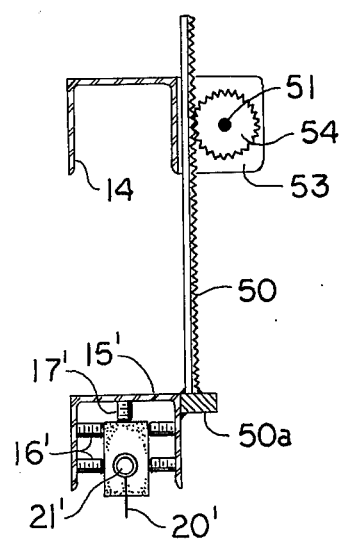
FIG. 3 is a side sectional view in elevation of an intermediate scale, particularly illustrating the construction of an upper blade assembly and means for assuring movement of its end portions in a fully horizontally aligned relationship.

Referring to FIGS. 1 and 3, the cross-extending channel member 15', is, at its ends, journaled for "up" and "down" movement on the columns 12. A pair of fluid motors or pneumatic cylinders 40 have their housings secured to the upper frame member 15 and have forward ends of their piston rod assemblies 41 secured to an upper face or web wall of the member 15' to extend upwardly therefrom. See also FIGS. 5A to 5C. Motors 40 constitute the actuating means for raising and lowering the upper cutting blade assembly.

To assure an aligned movement of the upper blade assembly, a suitable means such as rack gear means may be provided. In this connection, a rack 50 (see also FIG. 3) is shown secured at its lower end to a front ledge portion 50a which projects from the upper channel 15'. A bifurcated mount 53 is weld-secured to project forwardly from the upper channel-shaped frame member 14 to receive and journal one end of a cross-extending connecting shaft 51 on which a gear wheel 54 is secured for rotation therewith. Each gear 54 meshes with an associated rack 50 in such a manner that upper and lower movement of the pair of racks 50 is accomplished in step to maintain a horizontally aligned movement of the cutter blade 20' and assure a full width of uniform, cross, cutting-off action on a body length of resin or plastic sheet material 60 that is being severed.

To assure that a uniform depth of penetration of the blades 20 and 20' across the plastic or resin sheet material or body 60 is accomplished, two micro switches $S_4$ are provided adjacent opposite ends of the apparatus. The movable support channel 15' that carries the cutter assembly at each end also has an adjustable limit pin 25 that extends downwardly from a mounting lug 26. Each limit pin 25 is adapted to engage and push-in an operating pin or button of and open each of the normally-closed switches $S_4$ that thus de-energize solenoid $C_2$ and cut-off positive fluid pressure fluid through line 42 to upper ends of the motors 40 at the end of the "down" stroke. Due to the parallel connected relation of the switches $S_4$ (see FIG. 6), both must be pushed-in by an associated pin 25 to an "open" position before the solenoid $C_2$ is de-energized. As a further protection, each switch $S_4$ has a mechanical abutment or stop portion 27 (see FIG. 5A) which, when engaged by an associated pin 25, acts as a positive stop to prevent any possibility of direct engagement between fully vertical blades 20 and 20'.

Figure 4:
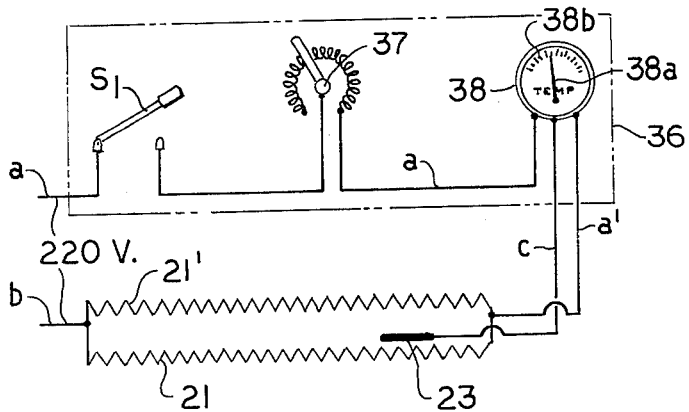
FIG. 4 is an electrical circuit diagram illustrating a suitable system for heating upper and lower blade assemblies and for indicating and controlling the temperature of blades of the assemblies.

FIG. 4 discloses a suitable circuit arrangement for energizing and controlling the temperature of the blades 20 and 20'. In this figure, $a$ and $b$ represent input terminals from a source of 220 volts, A.C., with the one terminal $b$ being connected to one terminal of each of the heating elements 21 and 21', and with the other terminal $a$ being connected through a switch $S_1$, a rheostat 37 and a temperature indicating unit 38 to the other terminal of each of the elements 21 and 21' through line $a'$. It will be noted that the two heating elements 21 and 21' are connected in parallel so that they receive the same amount of energization. Temperature-sensitive element 23 may (as shown in FIG. 2) be carried by the head 18 of the lower cutting blade assembly, and has a lead $c$ to the unit 38 to indicate through the agency of a finger 38a and a temperature scale 38b, the exact temperature of the head. The unit 23 may be of a conventional type such as used for the oven of an electric stove. Thus, the operator can adjust the amount of current being supplied through the agency of rheostat 37 so as to maintain the upper and lower cutting blade at a requisite cutting temperature which, for a typical resin material, such as a polystyrene or an acrylic sheet, may be within a range of about 400° to 500° F. It will be appreciated that the apparatus is constructed primarily for a so-called thermoplastic type of resin material, since the heating-melting of the immediate cutting line is an essential part of the operation. It has been found that the provision of blade temperatures that are sufficient to melt the particular resin involved is the criterion.

Referring to FIGS. 1 and 6, an operating circuit is shown for the pair of motors 40 which includes a source of 120 volts A.C., as supplied to terminals $d$ and $e$. The line $d$ is shown connected through a switch contact $S_3$ to one terminal of a valve-controlling solenoid coil $C_3$. A branch connection or line $f$ from line $d$ is shown connected through a switch $S_2$ and switches $S_4$ to one terminal of a second valve control solenoid coil $C_2$. The other terminals of the solenoids $C_2$ and $C_3$ are connected to the line $e$. The switches $S_2$ and $S_3$ have a common mechanical interlock, so that when one is open, the other must be closed. Parallel connected switches $S_4$ in the line $f$ leading to the one side of the solenoid $C_2$ assure that these normally closed switches do not interrupt energization of such solenoid until both of them are opened, as by the simultaneous pushing-in movement of their pin ends by the stop pins 25 in the manner shown in FIG. 5B.

A three-way control valve $V_1$ has its input connected through a positive fluid or air pressure source line 45, has an exhaust line 46, and a pair of fluid or air flow operating lines 42 and 43. It will be noted that the fluid line 42 is connected to the upper ends of the chambers of the motors 40, while fluid line 43 is connected to the lower ends of the chambers of the motors. The valve $V_1$, of conventional construction, is normally retained, as by spring means, in a closed position whereby fluid from the source line 45 is shut-off. When the solenoid $C_2$ is energized, this causes the valve $V_1$ to move to a position wherein positive pressure fluid is flowed from the source line 45 into the line 42 to cause the piston rod assemblies 41 to move downwardly or forwardly. At this time, the line 43 is connected through the valve $V_1$ to the exhaust line 46. On the other hand, when the coil $C_2$ is de-energized and the coil $C_3$ is energized, the valve $V_1$ connects the source line 45 to the line 43 to thus apply positive fluid pressure to the lower or front ends of the motors to cause their piston rod assemblies 41 to move upwardly. At this time, the valve $V_1$ connects the line 42 to the exhaust line 46.

In the operation of the machine, it will be apparent that commercial automatic controls may be utilized for the switch means $S_2$ and $S_3$. Also, the unit 38 may be a commercial controller which will include a current control means that will take the place of rheostat 37 for automatically maintaining the electrical heating units 21 and 21' at any desired temperature as set on a scale carried by the unit. Also, the switch means $S_2$, $S_3$ may be controlled by a timing means, by a sheet roller that operates on the basis of a desired length of material that passes thereover, or by a scanning means. However, such means is not a part of the invention and, for this reason, a simple mechanical type of control has been illustrated in FIG. 6. It will be appreciated that the temperature used may be varied for the type of material involved, and also to adjust for different thicknesses of the material. In other words, a 400°F temperature is sufficient for a thickness of an acrylic or styrene sheet up to, for example, ⅛ inch, while an intermediate 450°F temperature up to a 500°F temperature may be used for greater thicknesses, taking into consideration the limited time that the cutting blades contact the material.

A range between high and lower limits of the temperature of about 100° F. has been found to be sufficient in this connection, with the governing temperature being determined by the temperature at which the particular resin material will melt upon the application of cutting edges 20$b$ of the blades. In FIGS. 5A to 5C, suitable material advancing rolls, such as aluminum rolls, are shown spaced along the operating line. Rolls 61 and 62 serve (as shown in FIG. 5A) to advance a continuous body of material 60 to a cutting-off position or station. At cutting or groove-forming station of FIG. 5B, movement of the body of material 60 may be stopped while the pistons 40 lower the upper channel 15', the head 18 and the cutter blades 20' into opposed cutting-in, recess or groove-forming cooperation with the lower cutter blade 20. The sharp, hot blades 20 and 20' are driven into the plastic or resin sheet evenly across its full width to form cut-in recess or groove line portions that are somewhat sticky at the point or line of score. The upper blade 20' may be then withdrawn; its ejector blade 32 engages the underside of the material to lift it off the lower blade 20. The body of material 60 may be advanced along with the still-connected forward piece 60$a$ for about 12 to 18 inches on the rolls 61 and 62 (see FIG. 5C) to a position at which the line of cut has reached an upper, backup roll 63. At this time, the plastic or resin material is now cooled along the line of cut, and the piece 60$a$ may now be completely separated from the main body 60 by a breaking action. In FIG. 5C, the breaking action is shown being accomplished by a cooperative "up" movement of a push head 65 of a fluid or air motor 64 and a position-holding action of an upper roller 63. The upwardly flexed piece 60$a$ then returns to its normal planar shape and may be removed to a place of use or storage. As shown in FIG. 5B, since the blade 20 is stationary, the blade 20' is employed to, as shown, flex the body length of material 60 under the forward or down pressure of such blade into recess-forming engagement with the edge of the stationary blade 20. The extent of the movement is, as shown, controlled to provide an equalized depth of line recess formation in opposite side faces of the material, as effected by the relative movement of the blades, with a relatively thin central thickness of the material being retained.

I claim:

1. In a method of providing separate pieces from a body of solidified thermoplastic resin material which comprises, advancing the material into a cutting-off position, moving a pair of cutting blades into opposed engagement with opposite sides of the material and simultaneously applying opposed cutting-in blade pressure while flexing the resin material and applying melting heat along blade-engaging lines on the material to form opposed cut-in recesses extending from opposite sides of the material, releasing the blade pressure and returning the blades to their starting relationship with respect to the resin material, thereafter cooling and completing separation of a piece of the material from the body along the cut-in recesses.

2. In a method of providing separate pieces severed from a sheet-like body length of solidified thermoplastic resin material which comprises, advancing the material endwise towards and beyond a cutting station for a distance representing the desired length of a piece to be severed, at the cutting station relatively moving a knife-like pair of blades into a substantially evenly applied opposed-aligned engagement across opposite sides of the material and simultaneously applying opposed cutting-in blade pressure and melting heat along lines of blade engagement on the material, permitting the material to flex under blade pressure while forming opposed cut and melted-in line recesses across opposite sides of the material at the cutting station and retaining a relatively thin central thickness portion of the material between the line recesses, advancing the material from the cutting station and cooling it, and flexing the cooled material and breaking the piece off the body length across the material along the line recesses at the thin thickness portion.

3. In a method as defined in claim 2, after forming the opposed line recesses, moving one blade of the pair out of engagement with the material, and moving the material out of engagement with the other blade of the pair.

4. In a method as defined in claim 2, retaining one blade of the pair in a stationary position and moving the other blade of the pair fully within a plane representing and towards the one blade in forming the opposed cut and melted-in line recesses, and employing the other blade to simultaneously flex the material into recess forming engagement with the one blade.

5. In a method as defined in claim 4, after the forming of the opposed line recesses, first moving the other blade out of engagement with the material, then advancing the body length and moving the material out of engagement with the one blade.

6. In a method as defined in claim 4, positively moving the other blade evenly forwardly in exact synchronism along its full length extent towards the other blade in forming the line recesses, and positively limiting the forward movement of the other blade to avoid engagement of the pair of blades with each other.

7. In a method as defined in claim 2, positioning the material behind the recess lines between a pair of transversely engaging rolls while pushing the material ahead of the recess lines to flex it and break off the piece from the body length thereof.

8. In a method as defined in claim 2, effecting the relative movement of the cutting blades into opposed engagement with opposite sides of the material by first moving one blade of the pair of blades into engagement inwardly with one side of the material and by thereafter moving the opposite side of the material into engagement with the other blade of the pair under pressure force exerted by the one blade.

9. In a method as defined in claim 8, flexing the material across its full width towards the other blade during inward movement of the one blade.

10. In a method as defined in claim 9, flexing the material about the recess lines to break the piece off by pushing a forward portion thereof upwardly with respect to the body length.

11. In a method of progressively severing pieces from a longitudinal body of solidified thermoplastic resin material which comprises, providing a pair of opposed cutting-off blades at a cutting station, advancing the body endwise forwardly to a cutting position between the pair of blades at the cutting station, retaining the body in a stationary position at the cutting station while relatively moving the blades into an opposed cutting-in engagement with opposite sides thereof and applying melting heat through the blades along blade-engaging cutting lines on the material of the body, forming opposed cross-extending cut-in line recesses in the material while flexing it and retaining a relatively thin thickness portion of it between the line recesses by the application of positive pressure and heat along the material engaging blades on the opposite sides of the material, relatively moving the blades out of a cutting position with respect to each other, cooling the material along the recesses, advancing the body endwise forwardly to a final separating station and completely separating a forward piece of the material from the body while backing-up the body behind the recesses and flexing the forward piece with respect thereto about the recesses.

* * * * *